United States Patent
Uchida et al.

(10) Patent No.: US 10,828,839 B2
(45) Date of Patent: Nov. 10, 2020

(54) METHOD FOR PRODUCING LAYERED ARTICLE

(71) Applicant: NITTO DENKO CORPORATION, Osaka (JP)

(72) Inventors: Shou Uchida, Ibaraki (JP); Shinsuke Ikishima, Ibaraki (JP); Kohei Takeda, Ibaraki (JP); Muneshige Nakagawa, Ibaraki (JP); Ryuji Kuwabara, Ibaraki (JP); Ikuya Kuzuhara, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 187 days.

(21) Appl. No.: 15/763,254

(22) PCT Filed: Sep. 15, 2016

(86) PCT No.: PCT/JP2016/077308
§ 371 (c)(1),
(2) Date: Mar. 26, 2018

(87) PCT Pub. No.: WO2017/057028
PCT Pub. Date: Apr. 6, 2017

(65) Prior Publication Data
US 2018/0281296 A1    Oct. 4, 2018

(30) Foreign Application Priority Data

Sep. 29, 2015  (JP) ................................. 2015-190790
Sep. 6, 2016   (JP) ................................. 2016-173304

(51) Int. Cl.
*B32B 37/00* (2006.01)
*B29C 65/08* (2006.01)
(Continued)

(52) U.S. Cl.
CPC ............ *B29C 65/086* (2013.01); *B29C 65/18* (2013.01); *B29C 65/72* (2013.01);
(Continued)

(58) Field of Classification Search
USPC ....................................................... 156/73.1
See application file for complete search history.

(56) References Cited

U.S. PATENT DOCUMENTS 5,955,193 A     9/1999  Braun et al.
6,994,761 B2 *  2/2006  Klemp .............. A61F 13/49015
                                                    156/73.3
(Continued)

FOREIGN PATENT DOCUMENTS

CN    1201651    12/1998
CN    1615216    5/2005
(Continued)

OTHER PUBLICATIONS

English translation of International Search Report issued in PCT/JP2016/077308, dated Dec. 13, 2016.
(Continued)

*Primary Examiner* — James D Sells
(74) *Attorney, Agent, or Firm* — Greenblum & Bernstein, P.L.C.

(57) ABSTRACT

Provided is a method of producing a layered article by which a sufficient production speed can be achieved, and preferably, a variation in fusion strength can be suppressed and hence a variation in product quality can be reduced. The method of producing a layered article of the present invention includes fusing at least part of a single-layer body or a laminate including at least one layer including a non-woven fabric of fiber having a fiber diameter of 100 μm or less through ultrasonic welding.

17 Claims, 2 Drawing Sheets

(51) Int. Cl.
- *B32B 5/26* (2006.01)
- *B29C 65/78* (2006.01)
- *B29C 65/00* (2006.01)
- *D06H 5/00* (2006.01)
- *B29C 65/18* (2006.01)
- *B32B 5/02* (2006.01)
- *B29C 65/72* (2006.01)
- *D04H 1/559* (2012.01)
- *D06M 10/02* (2006.01)
- *B29C 65/82* (2006.01)
- *D04H 1/555* (2012.01)
- *B32B 37/06* (2006.01)
- *B29L 31/48* (2006.01)
- *B29L 31/00* (2006.01)
- *B29K 105/00* (2006.01)
- *A44B 18/00* (2006.01)

(52) U.S. Cl.
CPC ...... *B29C 65/7894* (2013.01); *B29C 65/8207* (2013.01); *B29C 66/1122* (2013.01); *B29C 66/21* (2013.01); *B29C 66/45* (2013.01); *B29C 66/729* (2013.01); *B29C 66/7294* (2013.01); *B29C 66/7392* (2013.01); *B29C 66/81433* (2013.01); *B29C 66/83411* (2013.01); *B29C 66/919* (2013.01); *B32B 5/02* (2013.01); *B32B 5/022* (2013.01); *B32B 5/26* (2013.01); *B32B 37/065* (2013.01); *D04H 1/555* (2013.01); *D04H 1/559* (2013.01); *D06H 5/00* (2013.01); *D06M 10/02* (2013.01); *A44B 18/0011* (2013.01); *B29C 66/71* (2013.01); *B29C 66/91421* (2013.01); *B29C 66/91431* (2013.01); *B29C 66/929* (2013.01); *B29C 66/939* (2013.01); *B29K 2105/0088* (2013.01); *B29L 2031/4835* (2013.01); *B29L 2031/4878* (2013.01); *B29L 2031/729* (2013.01); *B32B 2555/02* (2013.01); *D10B 2509/00* (2013.01)

(56) References Cited

U.S. PATENT DOCUMENTS

| | | |
|---|---|---|
| 8,347,466 B2 | 1/2013 | Baldauf et al. |
| 8,662,133 B2 | 3/2014 | Ninomiya et al. |
| 9,895,276 B2 | 2/2018 | Mizobuchi et al. |
| 1,002,293 A1 | 7/2018 | Mitsuno et al. |
| 1,005,284 A1 | 8/2018 | Mitsuno et al. |
| 2002/0197345 A1* | 12/2002 | Kubik .............. B29C 65/26 425/174.2 |
| 2005/0090172 A1 | 4/2005 | Matsuuro et al. |
| 2010/0132412 A1 | 6/2010 | Baldauf et al. |
| 2013/0167629 A1 | 7/2013 | Ninomiya et al. |
| 2014/0378925 A1 | 12/2014 | Mizobuchi et al. |
| 2015/0147530 A1 | 5/2015 | Mitsuno et al. |
| 2018/0154607 A1 | 6/2018 | Mitsuno et al. |

FOREIGN PATENT DOCUMENTS

| | | |
|---|---|---|
| CN | 1981723 | 9/2012 |
| CN | 104039289 | 9/2014 |
| CN | 104334341 | 2/2015 |
| EP | 1 464 476 | 10/2004 |
| JP | 2001-252510 | 9/2001 |
| JP | 2009-527315 | 7/2009 |
| JP | 2010-125337 | 6/2010 |
| JP | 2013-231249 | 11/2013 |
| JP | 2016-78242 | 5/2016 |
| WO | 2003/059611 | 7/2003 |
| WO | 2007/096842 | 8/2007 |
| WO | 2012/043171 | 4/2012 |
| WO | 2013/094591 | 6/2013 |

OTHER PUBLICATIONS

Official Communication issued in European Patent Office (EPO) Patent Application No. 16851202.8, dated Apr. 8, 2019.
Official Communication issued in China Patent Application No. 201680055631.0, dated Nov. 5, 2019, with an English translation thereof.

* cited by examiner

METHOD FOR PRODUCING LAYERED ARTICLE

TECHNICAL FIELD

The present invention relates to a method of producing a layered article.

BACKGROUND ART

Layered articles are proposed for materials for articles such as sanitary articles, for example, diapers and masks (see, for example, Patent Literatures 1 and 2).

In recent years, non-woven fabrics have been adopted for many of the layered articles to be used for sanitary articles (in particular, disposable diapers, supporters, masks, and the like).

At the time of the production of the layered articles adopting the non-woven fabrics, a step of producing a fused portion (fusing step) is sometimes adopted for, for example, holding a layered structure.

However, the adoption of the fusing step involves a problem in that the production speed of the layered article is not increased. In addition, a variation in fusion strength sometimes occurs in the fused portion to be produced by the fusing step, and the variation may cause a problem in that a variation in product quality occurs.

CITATION LIST

Patent Literature

[PTL 1] JP 2009-527315 A
[PTL 2] JP 2010-125337 A

SUMMARY OF INVENTION

Technical Problem

The present invention has been made to solve the conventional problems, and an object of the present invention is to provide a method of producing a layered article by which a sufficient production speed can be achieved, and preferably, a variation in fusion strength can be suppressed and hence a variation in product quality can be reduced.

Solution to Problem

A method of producing a layered article according to one embodiment of the present invention includes fusing at least part of a single-layer body or a laminate including at least one layer including a non-woven fabric of fiber having a fiber diameter of 100 μm or less through ultrasonic welding.

In one embodiment, the method includes fusing at least part of a laminate including two or three layers each including the non-woven fabric of the fiber having a fiber diameter of 100 μm or less through the ultrasonic welding.

In one embodiment, the ultrasonic welding includes continuous ultrasonic welding.

In one embodiment, the ultrasonic welding is performed with a horn and a rotating anvil.

In one embodiment, the rotating anvil is heated.

In one embodiment, a temperature of the heating is from 30° C. to 150° C.

In one embodiment, the temperature of the heating is from 40° C. to 100° C.

In one embodiment, the temperature of the heating is from 60° C. to 80° C.

In one embodiment, a fluctuation in temperature of the heating is within ±20° C.

In one embodiment, the fluctuation in temperature of the heating is within ±10° C.

In one embodiment, the fluctuation in temperature of the heating is within ±5° C.

In one embodiment, a surface of the rotating anvil has an embossed pattern.

In one embodiment, the embossed pattern includes a discontinuous embossed pattern.

In one embodiment, a ratio of an area of a fused portion obtained by the fusing through the ultrasonic welding to an area of an entire surface of the layered article to be produced is 50% or less.

In one embodiment, the ratio of the area of the fused portion is from 1% to 40%.

In one embodiment, the ratio of the area of the fused portion is from 10% to 30%.

In one embodiment, the fused portion obtained by the fusing includes a fused portion of pieces of the fiber.

In one embodiment, the number of holes each having a diameter of 100 μm or more present in the fused portion obtained by the fusing is 10 holes/m$^2$ or less.

In one embodiment, the number of holes each having a diameter of 100 μm or more present in the fused portion is 5 holes/m$^2$ or less.

Advantageous Effects of Invention

According to the present invention, the method of producing a layered article by which a sufficient production speed can be achieved, and preferably, a variation in fusion strength can be suppressed and hence a variation in product quality can be reduced can be provided.

DESCRIPTION OF EMBODIMENTS

<<1. Method of Producing Layered Article of the Present Invention>>

A production method of the present invention includes a method of producing a layered article, including fusing at least part of a single-layer body or a laminate including at least one layer including a non-woven fabric of fiber having a fiber diameter of 100 μm or less through ultrasonic welding. In the case where at least part of the single-layer body or the laminate including at least one layer including the non-woven fabric of the fiber having a fiber diameter of 100 μm or less is fused through the ultrasonic welding, the production speed of the layered article can be increased as compared to, for example, that in the case where at least part of the single-layer body or the laminate is fused through heat fusion. In addition, the layered article to be obtained has sufficient flexibility and can achieve a satisfactory touch feeling.

The fiber diameter of the fiber having a fiber diameter of 100 μm or less is preferably from 1 μm to 100 μm, more preferably from 1 μm to 80 μm, still more preferably from 1 μm to 60 μm, particularly preferably from 1 μm to 40 μm. In the case where at least part of the single-layer body or the laminate including at least one layer including the non-woven fabric of the fiber having a fiber diameter within such range is fused through the ultrasonic welding, the production speed can be further increased as compared to, for example, that in the case where at least part of the single-layer body or the laminate is fused through the heat fusion. In addition, the layered article to be obtained has more sufficient flexibility and can achieve a more satisfactory touch feeling.

Any appropriate ultrasonic welding may be adopted as the ultrasonic welding as long as the effect of the present invention is not impaired.

In the ultrasonic welding, members to be bonded are arranged between a part generally referred to as "horn", the part being configured to feed vibration energy with an ultrasonic wave, and a roll-shaped part generally referred to as "anvil" or "rotating anvil". In many cases, the horn is arranged vertically above the members to be bonded and the rotating anvil. The horn typically vibrates at from 20,000 Hz to 40,000 Hz to transfer energy typically in the form of frictional heat to the members to be bonded under pressure. Part of at least one of the members to be bonded is softened or melted by the frictional heat and the pressure, and hence the materials are bonded to each other.

A pressing force between the horn and the rotating anvil in the ultrasonic welding is preferably from 100 N to 1,500 N, more preferably from 300 N to 1,300 N, still more preferably from 500 N to 1,100 N, particularly preferably from 700 N to 1,000 N. When the pressing force between the horn and the rotating anvil in the ultrasonic welding falls within the above-mentioned range, the layered article to be obtained has more sufficient flexibility and can achieve a more satisfactory touch feeling. In addition, the production speed in the production method of the present invention can be further increased.

One preferred kind of ultrasonic welding is generally known as "continuous ultrasonic welding." The continuous ultrasonic welding is typically used for sealing members to be bonded that can be supplied into a bonding apparatus in a substantially continuous manner. In the continuous ultrasonic welding, the horn is typically fixed and the members to be bonded move directly below the horn. In one kind of continuous ultrasonic welding, the fixed horn and a rotating anvil surface are used. During the continuous ultrasonic welding, the members to be bonded are pulled between the horn and the rotating anvil. The horn typically extends in its lengthwise direction toward the members to be bonded, and its vibration moves along the horn in its axial direction to the materials.

In another preferred kind of ultrasonic welding, the horn is a rotation type, has a cylindrical shape, and rotates about its lengthwise direction axis. Input vibration is present in the axial direction of the horn and output vibration is present in the radial direction of the horn. The horn is arranged so as to be close to the rotating anvil, and the anvil can also typically rotate so that the members to be bonded may pass a space between cylindrical surfaces at a line velocity substantially equal to the tangential velocity of the cylindrical surfaces.

The ultrasonic welding is described in, for example, JP 2008-526552 A, JP 2010-195044 A, JP 2013-231249 A, JP 2015-16294 A, and U.S. Pat. No. 5,976,316 A, and the contents of the disclosures are incorporated herein by reference.

One preferred embodiment of the production method of the present invention is a method of producing a layered article, the method including fusing at least part of the single-layer body or the laminate including at least one layer including the non-woven fabric of the fiber having a fiber diameter of 100 μm or less through the ultrasonic welding, and the ultrasonic welding is performed with a heated rotating anvil. When the ultrasonic welding is performed with a rotating anvil that has not been heated, in the case where the fusion is continuously performed, heat accumulates in each of the horn and the rotating anvil with time. Accordingly, a fusion strength varies in each of the machine direction and transverse direction of the layered article, and hence a variation in product quality occurs. When the ultrasonic welding is performed with the heated rotating anvil, the heat accumulation in each of the horn and the rotating anvil with time can be reduced. Accordingly, the variation in fusion strength can be suppressed, and hence the variation in product quality can be reduced. In addition, when the heated rotating anvil is used, the heat of the rotating anvil can be utilized as energy needed for the fusion, and hence more energy can be used for the fusion. As a result, the production speed can be increased.

When the ultrasonic welding is performed with the heated rotating anvil, its heating temperature is preferably from 30° C. to 150° C., more preferably from 35° C. to 120° C., still more preferably from 40° C. to 100° C., particularly preferably from 50° C. to 90° C., most preferably from 60° C. to 80° C. When the heating temperature of the rotating anvil falls within the above-mentioned range, the heat accumulation in each of the horn and the rotating anvil with time can be reduced. Accordingly, the variation in fusion strength can be suppressed, and hence the variation in product quality can be reduced. In addition, the heat of the rotating anvil can be utilized as energy needed for the fusion, and hence more energy can be used for the fusion. As a result, the production speed can be increased. In addition, when the heating temperature of the rotating anvil falls within the above-mentioned range, the layered article to be obtained has more sufficient flexibility and can achieve a more satisfactory touch feeling.

When the ultrasonic welding is performed with the heated rotating anvil, further, a fluctuation in temperature of the rotating anvil is preferably within ±20° C., more preferably within ±10° C., still more preferably within ±8° C., particularly preferably within ±5° C., most preferably within ±2° C. When the fluctuation in temperature of the rotating anvil falls within the above-mentioned range, the variation in fusion strength can be further suppressed, and hence the variation in product quality can be further reduced. Further, when the fluctuation in temperature of the rotating anvil falls within the above-mentioned range, the layered article to be obtained has more sufficient flexibility and can achieve a more satisfactory touch feeling.

Any appropriate method may be adopted as a method of heating the rotating anvil as long as the effect of the present invention is not impaired. Examples of such method include an induction heat generation system, an electric heating system, a heat medium circulation system, and a steam heating system.

Figure 1:
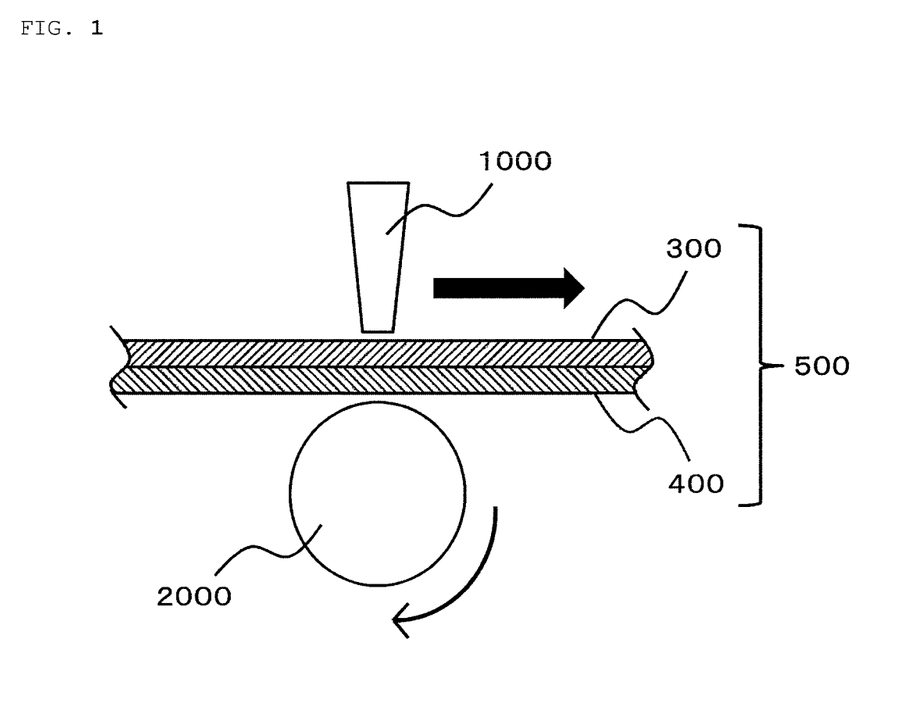
FIG. 1 is a schematic sectional view for illustrating an example of a preferred production method of the present invention.

FIG. 1 is a schematic sectional view for illustrating an example of a preferred production method of the present invention. In FIG. 1, reference numeral 1000 represents a horn and reference numeral 2000 represents a rotating anvil. A laminate 500 of an engaging layer 300 and a physical property layer 400 flows between the horn 1000 and the rotating anvil 2000 in a direction indicated by the arrow, and ultrasonic welding is performed between the horn 1000 and the rotating anvil 2000. The horn 1000 and the engaging layer 300 may be in contact with each other, or may be out of contact with each other. The rotating anvil 2000 and the physical property layer 400 may be in contact with each other, or may be out of contact with each other. The laminate 500 that has passed a space between the horn 1000 and the rotating anvil 2000 can be the layered article obtained by the production method of the present invention (e.g., a hook-and-loop fastener female member).

In the method including fusing at least part of the single-layer body or the laminate including at least one layer including the non-woven fabric of the fiber having a fiber diameter of 100 μm or less through the ultrasonic welding, the ratio of the area of a fused portion obtained by the fusing through the ultrasonic welding to the area of the entire surface of the layered article to be produced (hereinafter sometimes referred to as "fused area ratio") is preferably 50% or less, more preferably from 1% to 40%, still more preferably from 5% to 35%, particularly preferably from 10% to 30%, most preferably from 15% to 25%. When the above-mentioned fused area ratio falls within the above-mentioned range, the layered article obtained by the production method of the present invention has more sufficient flexibility and can achieve a more satisfactory touch feeling. In addition, when the above-mentioned fused area ratio falls within the above-mentioned range, the production speed can be increased. As described later, when an embossed pattern is provided on the surface of the rotating anvil, the "fused area ratio" is sometimes rephrased as an "embossing-fused area ratio."

The surface of the rotating anvil preferably has an embossed pattern. Specific examples of such embossed pattern include a continuous grid shape, a discontinuous grid shape, a continuous curve shape, a discontinuous curve shape, a continuous zigzag shape, a discontinuous zigzag shape, a continuous linear shape, a discontinuous linear shape, a circle shape, an ellipse shape, a hollow circle shape, a hollow ellipse shape, an arc shape, and a hollow arc shape.

The embossed pattern is preferably a discontinuous embossed pattern, more preferably an embossed pattern of an arc shape, because the effect of the present invention can be more effectively expressed. An example of the embossed pattern of an arc shape that the surface of the rotating anvil may have is an embossed pattern that may impart an embossed pattern of an arc shape illustrated in FIG. 2 to the layered article to be produced.

Figure 2:
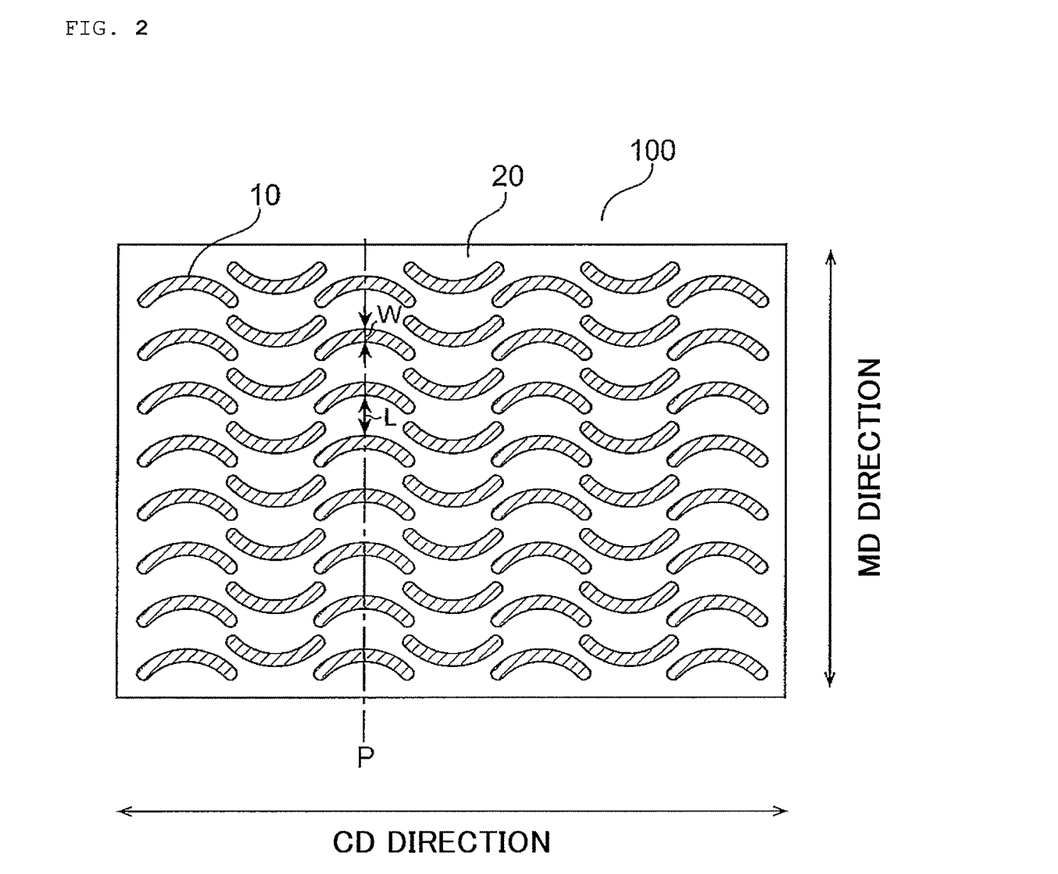
FIG. 2 is a schematic plan view of an example of an embossed pattern of an arc shape.

FIG. 2 is a schematic plan view for illustrating an example of the embossed pattern that may be imparted to the surface of the layered article obtained by the production method of the present invention, and the embossed pattern has a plurality of embossments 10 serving as concave portions. An embossed pattern having embossments serving as convex portions that may form the embossments 10 may be provided on the surface of the rotating anvil. Individual embossments serving as convex portions are embossments having no "corners".

The embossment width of each of the plurality of embossments serving as convex portions forming the embossed pattern is preferably from 0.1 mm to 3.0 mm, more preferably from 0.3 mm to 2.0 mm, still more preferably from 0.3 mm to 1.5 mm, particularly preferably from 0.5 mm to 1.5 mm, most preferably from 0.5 mm to 1.0 mm. When the embossment width falls within the above-mentioned range, the layered article obtained by the production method of the present invention has more sufficient flexibility and can achieve a more satisfactory touch feeling. The embossment width corresponds to, for example, a width W of each of the embossments 10 in an MD direction as illustrated in FIG. 2.

The distance between two adjacent embossments in the plurality of embossments forming the embossed pattern on any line in the MD direction is preferably 10 mm or less, more preferably from 1 mm to 10 mm, still more preferably from 1.5 mm to 9 mm, particularly preferably from 2 mm to 8 mm, most preferably from 2.5 mm to 7 mm. When the distance between two adjacent embossments in the plurality of embossments forming the embossed pattern on any line in the MD direction falls within the above-mentioned range, the layered article obtained by the production method of the present invention has more sufficient flexibility and can achieve a more satisfactory touch feeling. The distance between two adjacent embossments in the plurality of embossments forming the embossed pattern on a line in the MD direction corresponds to, for example, a distance L between two adjacent embossments on a line P in the MD direction illustrated in FIG. 2 (which may be a line in the MD direction at any position in a CD direction).

The height of each of the embossments serving as convex portions is preferably from 0.1 mm to 2.0 mm, more preferably from 0.2 mm to 1.8 mm, still more preferably from 0.3 mm to 1.5 mm, particularly preferably from 0.5 mm to 1.5 mm, most preferably from 0.7 mm to 1.2 mm. When the height of each of the embossments serving as convex portions falls within the above-mentioned range, the layered article obtained by the production method of the present invention has more sufficient flexibility and can achieve a more satisfactory touch feeling.

<<2. Layered Article Obtained by Production Method of the Present Invention>>

A layered article obtained by the production method of the present invention is a layered article including at least one layer including a non-woven fabric of fiber having a fiber diameter of 100 μm or less. The number of the layers each including the non-woven fabric of fiber of the layered article obtained by the production method of the present invention is preferably from 1 to 10, more preferably from 1 to 7, still more preferably from 1 to 5, particularly preferably from 1 to 3, most preferably 2 or 3. When the number of the layers each including the non-woven fabric of fiber of the layered article obtained by the production method of the present invention falls within the above-mentioned range, the layered article has more sufficient flexibility and can achieve a more satisfactory touch feeling.

The layered article obtained by the production method of the present invention may include any appropriate other layer as long as the layered article includes at least one layer including the non-woven fabric of fiber, and the effect of the present invention is not impaired.

The layered article obtained by the production method of the present invention has a fused portion. When the layered article obtained by the production method of the present invention has the fused portion, the layered article obtained by the production method of the present invention has more sufficient flexibility and can achieve a more satisfactory touch feeling.

The fused portion preferably includes a fused portion of pieces of the fiber of the layer including the non-woven fabric of fiber.

In the fused portion, the number of holes each having a diameter of 100 μm or more present in the fused portion is preferably 10 holes/m² or less, more preferably 5 holes/m² or less, still more preferably 3 holes/m² or less, particularly preferably 0 holes/m². When the number of the holes each having a diameter of 100 μm or more present in the fused portion falls within the above-mentioned range, the external appearance of the layered article is improved and its breakage starting from the holes hardly occurs.

The fused portion preferably has an embossed pattern. Such embossed pattern is preferably formed by embossing treatment. Specific examples of the embossed pattern include a continuous grid shape, a discontinuous grid shape, a continuous curve shape, a discontinuous curve shape, a continuous zigzag shape, a discontinuous zigzag shape, a continuous linear shape, a discontinuous linear shape, a circle shape, an ellipse shape, a hollow circle shape, a hollow ellipse shape, an arc shape, and a hollow arc shape.

The embossed pattern is preferably a discontinuous embossed pattern, more preferably an embossed pattern of an arc shape, because the effect of the present invention can be more effectively expressed. A schematic plan view of an example of the embossed pattern of an arc shape is as illustrated in FIG. 2. In FIG. 2, a fused portion 100 has a plurality of embossments 10 forming an embossed pattern of an arc shape. In FIG. 2, the fused portion 100 has a region 20 free of the embossed pattern. In the embossed pattern of an arc shape, it is preferred that individual embossments be embossments having no "corners".

The embossment width of each of the plurality of embossments forming the embossed pattern is preferably from 0.1 mm to 3.0 mm, more preferably from 0.3 mm to 2.0 mm, still more preferably from 0.3 mm to 1.5 mm, particularly preferably from 0.5 mm to 1.5 mm, most preferably from 0.5 mm to 1.0 mm. When the embossment width falls within the above-mentioned range, the layered article obtained by the production method of the present invention has more sufficient flexibility and can achieve a more satisfactory touch feeling. The embossment width refers to, for example, a width W of each of the embossments 10 in an MD direction as illustrated in FIG. 2.

The distance between two adjacent embossments in the plurality of embossments forming the embossed pattern on any line in the MD direction is preferably 10 mm or less, more preferably from 1 mm to 10 mm, still more preferably from 1.5 mm to 9 mm, particularly preferably from 2 mm to 8 mm, most preferably from 2.5 mm to 7 mm. When the distance between two adjacent embossments in the plurality of embossments forming the embossed pattern on any line in the MD direction falls within the above-mentioned range, the layered article obtained by the production method of the present invention has more sufficient flexibility and can achieve a more satisfactory touch feeling. The distance between two adjacent embossments in the plurality of embossments forming the embossed pattern on a line in the MD direction is, for example, a distance L between two adjacent embossments on a line P in the MD direction illustrated in FIG. 2 (which may be a line in the MD direction at any position in a CD direction).

The depth of each of the embossments is preferably from 0.1 mm to 2.0 mm, more preferably from 0.2 mm to 1.8 mm, still more preferably from 0.3 mm to 1.5 mm, particularly preferably from 0.5 mm to 1.5 mm, most preferably from 0.7 mm to 1.2 mm. When the depth of each of the embossments falls within the above-mentioned range, the layered article obtained by the production method of the present invention has more sufficient flexibility and can achieve a more satisfactory touch feeling.

The ratio of the area of a fused portion formed by the embossed pattern to the area of the entire surface of the layered article obtained by the production method of the present invention (hereinafter sometimes referred to as "embossing-fused area ratio") is preferably 50% or less, more preferably from 1% to 40%, still more preferably from 5% to 35%, particularly preferably from 10% to 30%, most preferably from 15% to 25%. When the embossing-fused area ratio falls within the above-mentioned range, the layered article obtained by the production method of the present invention has more sufficient flexibility and can achieve a more satisfactory touch feeling.

The layered article obtained by the production method of the present invention preferably has an index A, which is represented by the equation (1), of $0.90\times10^{-6}$ m$^3$/g or less.

$$A=T/G \qquad (1)$$

In the equation (1), T represents the thickness (unit: m) of the fused portion and G represents a basis weight (unit: g/m$^2$). The basis weight means the total basis weight of the entirety of the layered article obtained by the production method of the present invention.

The index A is preferably $0.75\times10^{-6}$ m$^3$/g or less, more preferably from $0.20\times10^{-6}$ m$^3$/g to $0.72\times10^{-6}$ m$^3$/g, still more preferably from $0.30\times10^{-6}$ m$^3$/g to $0.70\times10^{-6}$ m$^3$/g, particularly preferably from $0.40\times10^{-6}$ m$^3$/g to $0.65\times10^{-6}$ m$^3$/g, most preferably from $0.50\times10^{-6}$ m$^3$/g to $0.60\times10^{-6}$ m$^3$/g.

When the index A falls within the above-mentioned range, the layered article obtained by the production method of the present invention has more sufficient flexibility and can achieve a more satisfactory touch feeling.

The index A is an indicator appropriately reflecting the flexibility of a layered article including at least one layer including a non-woven fabric of fiber, and having a fused portion like the layered article obtained by the production method of the present invention. A state in which the index A is smaller reflects a state in which the amount of a material for the layered article of the fused portion in a thickness direction thereof is smaller than the amount of the material for the layered article of a non-fused portion in a thickness direction thereof. Such portion having the smaller amount of the material for the layered article serves as a starting point of bending, and hence the flexibility is improved. In the layered article of the present invention, an index A at a level of $0.90\times10^{-6}$ m$^3$/g or less can be said to reflect a state in which the layered article is particularly excellent in flexibility as a practical effect. Although the index A is desirably as small as possible, a lower limit value for the index A is preferably $0.50\times10^{-6}$ m/g as described above because when the index is excessively small, a problem in that the layered article ruptures at the time of its bending may occur.

The T representing the thickness (unit: m) of the fused portion is preferably $35\times10^{-6}$ m or less, more preferably from $1\times10^{-6}$ m to $30\times10^{-6}$ m, still more preferably from $5\times10^{-6}$ m to $28\times10^{-6}$ m, particularly preferably from $10\times10^{-6}$ m to $25\times10^{-6}$ m, most preferably from $15\times10^{-6}$ m to $22\times10^{-6}$ m. When the T falls within the above-mentioned range, the layered article of the present invention has more sufficient flexibility and can achieve a more satisfactory touch feeling.

The G representing the basis weight (unit: g/m$^2$) is preferably 50 g/m$^2$ or less, more preferably from 1 g/m$^2$ to 48 g/m$^2$, still more preferably from 10 g/m$^2$ to 46 g/m$^2$, particularly preferably from 20 g/m$^2$ to 43 g/m$^2$, most preferably from 30 g/m$^2$ to 40 g/m$^2$. When the G falls within the above-mentioned range, the layered article of the present invention has more sufficient flexibility and can achieve a more satisfactory touch feeling.

One embodiment of the layered article obtained by the production method of the present invention is a hook-and-loop fastener female member. The hook-and-loop fastener female member includes an engaging layer engageable with a male member (sometimes referred to as "mechanical hook member"). The engaging layer of the hook-and-loop fastener female member is specifically a layer on which an engaging hook (or something having properties equivalent to those of the engaging hook) of a hook-and-loop fastener male member is engageable. A product including the hook-and-loop fastener female member and a hook-and-loop fastener male member configured to engage with the hook-and-loop fastener female member serves as a hook-and-loop fastener.

The hook-and-loop fastener female member preferably includes the engaging layer engageable with a hook-and-loop fastener male member and a physical property layer configured to hold the engaging layer. The hook-and-loop fastener female member may include any appropriate other member in addition to such engaging layer and physical property layer, as long as the effect of the present invention is not impaired. The hook-and-loop fastener female member is preferably formed of the engaging layer engageable with a hook-and-loop fastener male member and the physical property layer configured to hold the engaging layer.

The thickness of the hook-and-loop fastener female member may be set to any appropriate thickness depending on the purpose. Typically, the thickness of the hook-and-loop fastener female member is preferably from 0.2 mm to 5.0 mm, more preferably from 0.3 mm to 4.0 mm, still more preferably from 0.5 mm to 3.0 mm, particularly preferably from 0.5 mm to 2.0 mm.

The engaging layer includes a non-woven fabric of fiber. The number of layers of the engaging layer may be only one, or may be two or more. The engaging layer is preferably formed only of the non-woven fabric of fiber.

The number of kinds of the non-woven fabric of fiber included in the engaging layer may be only one, or may be two or more.

Examples of the non-woven fabric of fiber included in the engaging layer include a spunbonded non-woven fabric, a thermally bonded non-woven fabric, a bonded and joined non-woven fabric, an air-through non-woven fabric, a meltblown non-woven fabric, a spunbonded meltblown spunbonded non-woven fabric, a spunbonded meltblown meltblown spunbonded non-woven fabric, an unjoined non-woven fabric, an electrospun non-woven fabric, a flashspun non-woven fabric (e.g., TYVEK™ from DuPont), and a carded non-woven fabric. Of the above-mentioned non-woven fabrics, a spunbonded non-woven fabric, a thermally bonded non-woven fabric, a bonded and joined non-woven fabric, an air-through non-woven fabric, a meltblown non-woven fabric, a spunbonded meltblown spunbonded non-woven fabric, or a spunbonded meltblown meltblown spunbonded non-woven fabric is preferred, a spunbonded non-woven fabric or an air-through non-woven fabric is more preferred, and a spunbonded non-woven fabric is still more preferred. When, for example, a thermal point-bonded spunbonded non-woven fabric or an air-through non-woven fabric is used as the non-woven fabric of fiber included in the engaging layer, pieces of the fiber forming the non-woven fabric included in the engaging layer can have mutual bonding points. With this, when the hook-and-loop fastener female member has an embossed pattern, not only pieces of the fiber forming the non-woven fabric included in the engaging layer have firm mutual bonding points in the embossed pattern portions as a result of embossing treatment, but also pieces of the fiber forming the non-woven fabric included in the engaging layer have mutual bonding points in a region free of the embossed pattern. When such structure can be achieved, the hook-and-loop fastener female member has more sufficient flexibility, can achieve a more satisfactory touch feeling, and is excellent in engaging force with a hook-and-loop fastener male member.

In the case where the non-woven fabric of fiber included in the engaging layer is a spunbonded non-woven fabric, the number of bonding points per unit area to be recognized in the region free of the embossed pattern in observation of the non-woven fabric of fiber included in the engaging layer with an optical microscope in a 17 mm×13 mm field of view (at a magnification of 7.5) is preferably from 10 to 200, more preferably from 30 to 150, still more preferably from 50 to 100. In the case where the non-woven fabric of fiber included in the engaging layer is a spunbonded non-woven fabric, when the number of bonding points per unit area to be recognized in observation of the non-woven fabric of fiber included in the engaging layer with an optical microscope falls within the above-mentioned range, the hook-and-loop fastener female member has more sufficient flexibility and can achieve a more satisfactory touch feeling, and fluffing of the engaging layer after peeling after engagement with a hook-and-loop fastener male member can be more effectively suppressed.

In the case where the non-woven fabric of fiber included in the engaging layer is an air-through non-woven fabric, the number of bonding points per unit area to be recognized in the region free of the embossed pattern in observation of the non-woven fabric of fiber included in the engaging layer with an SEM in a 1.3 mm×1.0 mm field of view (at a magnification of 100) is preferably 1 or more, more preferably from 2 to 100, still more preferably from 5 to 50. In the case where the non-woven fabric of fiber included in the engaging layer is an air-through non-woven fabric, when the number of bonding points per unit area to be recognized in observation of the non-woven fabric of fiber included in the engaging layer with an SEM falls within the above-mentioned range, the hook-and-loop fastener female member has more sufficient flexibility and can achieve a more satisfactory touch feeling, and fluffing of the engaging layer after peeling after engagement with a hook-and-loop fastener male member can be more effectively suppressed.

The non-woven fabric of fiber included in the engaging layer may contain fiber that is a homogeneous structural body, or may contain composite fiber that is a bicomponent structural body, such as a core-sheath structure, a side-by-side structure, a sea-island structure, or any other bicomponent structure. Detailed descriptions of the non-woven fabric may be found in, for example, "Nonwoven Fabric Primer and Reference Sampler," E. A. Vaughn, Association of the Nonwoven Fabrics Industry, third edition (1992).

Any appropriate fiber may be adopted as the fiber forming the non-woven fabric included in the engaging layer as long as the effect of the present invention is not impaired. For example, such fiber contains polyolefin (such as polypropylene or polyethylene), polyester, polyamide, polyurethane, an elastomer, rayon, cellulose, acrylic, a copolymer thereof, or a blend thereof, or a mixture thereof. Such fiber includes preferably at least one kind selected from fiber of polyolefin (polyolefin fiber), fiber of polyester (polyester fiber), and composite fiber of two or more kinds of resins selected from polyolefin and polyester because the effect of the present invention can be more effectively expressed.

Examples of the polyolefin fiber include polypropylene fiber, polyethylene fiber, and α-olefin copolymer fiber. The polyolefin fiber is preferably polypropylene fiber or polyethylene fiber, more preferably polypropylene fiber because the effect of the present invention can be more effectively expressed.

Examples of the polyester fiber include polyethylene terephthalate (PET) fiber, polylactic acid fiber, and polyglycolic acid fiber. The polyester fiber is preferably polyethylene terephthalate (PET) fiber because the effect of the present invention can be more effectively expressed.

Examples of the composite fiber of two or more kinds of resins selected from polyolefin and polyester include fiber having a core-sheath structure, fiber having a side-by-side structure, and hollow fiber. As used herein, the term "composite fiber of two or more kinds of resins selected from polyolefin and polyester" means composite fiber of resins that are two or more kinds of polyolefin, composite fiber of resins that are two or more kinds of polyester, or composite fiber of resins that are one or more kinds of polyolefin and one or more kinds of polyester.

Specific examples of the composite fiber of two or more kinds of resins selected from polyolefin and polyester include: fiber having a core-sheath structure in which its core portion contains one of two kinds of polyolefin and its sheath portion contains the other; fiber having a core-sheath structure in which its core portion contains polyester and its sheath portion contains polyolefin; and fiber in which polyolefin and polyester form a side-by-side structure.

The fiber forming the non-woven fabric included in the engaging layer may be crimpable fiber. An example of the crimpable fiber is fiber containing two components having different freezing points, the fiber having a side-by-side structure or an unevenly distributed core-sheath structure, the fiber expressing fine coiled crimps each having a relatively small radius because the component having the higher freezing point first solidifies and shrinks at the time of a phase change from a molten state to a solid state.

The fiber forming the non-woven fabric included in the engaging layer may contain any appropriate other component as long as the effect of the present invention is not impaired. Examples of such other component include other polymers, a tackifier, a plasticizer, an antidegradant, a pigment, a dye, an antioxidant, an antistatic agent, a lubricant, a blowing agent, a heat stabilizer, a light stabilizer, an inorganic filler, and an organic filler. Those components may be used alone or in combination thereof. The content of the other component in the fiber forming the non-woven fabric included in the engaging layer is preferably 10 wt % or less, more preferably 7 wt % or less, still more preferably 5 wt % or less, particularly preferably 2 wt % or less, most preferably 1 wt % or less.

In the hook-and-loop fastener female member, the density of the non-woven fabric in the engaging layer is preferably from 5 kg/m$^3$ to 100 kg/m$^3$, more preferably from 10 kg/m$^3$ to 100 kg/m$^3$, still more preferably from 10 kg/m$^3$ to 80 kg/m$^3$, still more preferably from 10 kg/m$^3$ to 70 kg/m$^3$, particularly preferably from 10 kg/m$^3$ to 60 kg/m$^3$, most preferably from 20 kg/m$^3$ to 50 kg/m$^3$, because the effect of the present invention can be more effectively expressed.

In the hook-and-loop fastener female member, when the density of the non-woven fabric in the engaging layer falls within the above-mentioned range, the flexibility becomes more sufficient, a more satisfactory touch feeling can be achieved, and the engaging force with a hook-and-loop fastener male member is more excellent, and hence, in a disposable diaper or the like, the problem of slippage, for example, at the time of wearing or after excretion can be effectively eliminated. In the hook-and-loop fastener female member, when the density of the non-woven fabric in the engaging layer is lower than 5 kg/m$^3$, there is a fear that a hook-and-loop fastener male member may be hardly hooked or productivity may be poor, leading to an increased cost. When the density of the non-woven fabric in the engaging layer is higher than 100 kg/m$^3$, a state in which the fiber of the non-woven fabric of the hook-and-loop fastener female member is densely packed is established, and hence there is a fear that it may be difficult to insert the engaging portion of a hook-and-loop fastener male member into the hook-and-loop fastener female member and an excellent engaging force cannot be expressed. The density (kg/m$^3$) of the non-woven fabric in the engaging layer is a value calculated from the basis weight (X g/m$^2$) of the non-woven fabric and the thickness (Y mm) of the non-woven fabric. More specifically, the density (kg/m$^3$) of the non-woven fabric in the engaging layer is calculated as X/Y (kg/m$^3$).

In the hook-and-loop fastener female member, the diameter of the fiber (hereinafter sometimes referred to simply as "fiber diameter") of the non-woven fabric in the engaging layer is preferably from 5 μm to 60 μm, more preferably from 10 μm to 60 μm, still more preferably from 10 μm to 50 μm, still more preferably from 10 μm to 40 μm, particularly preferably from 15 μm to 40 μm, most preferably from 20 μm to 40 μm, because the effect of the present invention can be more effectively expressed. In the hook-and-loop fastener female member, when the diameter of the fiber of the non-woven fabric in the engaging layer falls within the above-mentioned range, the flexibility becomes more sufficient, a more satisfactory touch feeling can be achieved, and the engaging force with a hook-and-loop fastener male member is more excellent, and hence, in a disposable diaper or the like, the problem of slippage, for example, at the time of wearing or after excretion can be effectively eliminated. In the hook-and-loop fastener female member, when the diameter of the fiber of the non-woven fabric in the engaging layer is smaller than 5 μm, there is a fear that the engaging force with a hook-and-loop fastener male member may lower. When the diameter of the fiber of the non-woven fabric in the engaging layer is larger than 60 μm, there is a fear that engagement with a hook-and-loop fastener male member may become difficult or production speed may lower, leading to an increased cost.

In the hook-and-loop fastener female member, the basis weight of the non-woven fabric in the engaging layer is preferably from 10 g/m$^2$ to 60 g/m$^2$, more preferably from 12 g/m$^2$ to 50 g/m$^2$, still more preferably from 15 g/m$^2$ to 40 g/m$^2$, particularly preferably from 15 g/m$^2$ to 30 g/m$^2$, most preferably from 15 g/m$^2$ to 25 g/m$^2$. In the hook-and-loop fastener female member, when the basis weight of the non-woven fabric in the engaging layer falls within the above-mentioned range, there can be provided a hook-and-loop fastener female member that has more sufficient flexibility, can achieve a more satisfactory touch feeling, and is more excellent in engaging force with a hook-and-loop fastener male member.

Any appropriate material may be adopted as a material for the physical property layer as long as the effect of the present invention is not impaired. Examples of the material for the physical property layer include a non-woven fabric of fiber and a film, which are preferred because the effect of the present invention can be more expressed. Of those, a non-woven fabric of fiber is more preferred because the effect of the present invention can be more effectively expressed. That is, the hook-and-loop fastener female member is preferably formed only of non-woven fabrics because the effect of the present invention can be more effectively expressed.

When the material for the physical property layer is a non-woven fabric of fiber, the number of kinds of the non-woven fabric may be only one, or may be two or more.

When the material for the physical property layer is a non-woven fabric of fiber, examples of the non-woven fabric include a spunbonded non-woven fabric, a thermally bonded non-woven fabric, a bonded and joined non-woven fabric, an air-through non-woven fabric, a meltblown non-woven fabric, a spunlace non-woven fabric, a spunbonded meltblown spunbonded non-woven fabric, a spunbonded meltblown meltblown spunbonded non-woven fabric, an unjoined non-woven fabric, an electrospun non-woven fabric, a flashspun non-woven fabric (such as TYVEK™ from DuPont), and a carded non-woven fabric.

When the material for the physical property layer is a non-woven fabric of fiber, the non-woven fabric may contain fiber that is a homogeneous structural body, or may contain composite fiber that is a bicomponent structural body, such as a core-sheath structure, a side-by-side structure, a sea-island structure, or any other bicomponent structure. Detailed descriptions of the non-woven fabric may be found in, for example, "Nonwoven Fabric Primer and Reference Sampler," E. A. Vaughn, Association of the Nonwoven Fabrics Industry, third edition (1992).

When the material for the physical property layer is a non-woven fabric of fiber, any appropriate fiber may be adopted as the fiber as long as the effect of the present invention is not impaired. For example, such fiber contains polyolefin (such as polypropylene or polyethylene), polyester, polyamide, polyurethane, an elastomer, rayon, cellulose, acrylic, a copolymer thereof, or a blend thereof, or a mixture thereof. Such fiber includes preferably at least one kind selected from fiber of polyolefin (polyolefin fiber), fiber of polyester (polyester fiber), and composite fiber of two or more kinds of resins selected from polyolefin and polyester because the effect of the present invention can be more effectively expressed.

Examples of the polyolefin fiber include polypropylene fiber, polyethylene fiber, and α-olefin copolymer fiber. The polyolefin fiber is preferably polypropylene fiber or polyethylene fiber, more preferably polypropylene fiber because the effect of the present invention can be more effectively expressed.

Examples of the polyester fiber include polyethylene terephthalate (PET) fiber, polylactic acid fiber, and polyglycolic acid fiber. The polyester fiber is preferably polyethylene terephthalate (PET) fiber because the effect of the present invention can be more effectively expressed.

Examples of the composite fiber of two or more kinds of resins selected from polyolefin and polyester include fiber having a core-sheath structure, fiber having a side-by-side structure, and hollow fiber. As used herein, the term "composite fiber of two or more kinds of resins selected from polyolefin and polyester" means composite fiber of resins that are two or more kinds of polyolefin, composite fiber of resins that are two or more kinds of polyester, or composite fiber of resins that are one or more kinds of polyolefin and one or more kinds of polyester.

Specific examples of the composite fiber of two or more kinds of resins selected from polyolefin and polyester include: fiber having a core-sheath structure in which its core portion contains one of two kinds of polyolefin and its sheath portion contains the other; fiber having a core-sheath structure in which its core portion contains polyester and its sheath portion contains polyolefin; and fiber in which polyolefin and polyester form a side-by-side structure.

When the material for the physical property layer is a non-woven fabric of fiber, the fiber forming the non-woven fabric may be crimpable fiber. An example of the crimpable fiber is fiber containing two components having different freezing points, the fiber having a side-by-side structure or an unevenly distributed core-sheath structure, the fiber expressing fine coiled crimps each having a relatively small radius because the component having the higher freezing point first solidifies and shrinks at the time of a phase change from a molten state to a solid state.

When the material for the physical property layer is a non-woven fabric of fiber, the fiber forming the non-woven fabric may contain any appropriate other component as long as the effect of the present invention is not impaired. Examples of such other component include other polymers, a tackifier, a plasticizer, an antidegradant, a pigment, a dye, an antioxidant, an antistatic agent, a lubricant, a blowing agent, a heat stabilizer, a light stabilizer, an inorganic filler, and an organic filler. Those components may be used alone or in combination thereof. The content of the other component in the fiber forming the non-woven fabric included in the engaging layer is preferably 10 wt % or less, more preferably 7 wt % or less, still more preferably 5 wt % or less, particularly preferably 2 wt % or less, most preferably 1 wt % or less.

When the material for the physical property layer is a film, any appropriate material may be adopted as a material for the film as long as the effect of the present invention is not impaired. Examples of such material include an unstretched polypropylene film, a stretched polypropylene film, and a polyethylene film each having a thickness of from 10 µm to 60 µm, which are preferred because the effect of the present invention can be more effectively expressed.

When the physical property layer is a non-woven fabric of fiber, the non-woven fabric in the physical property layer has a basis weight of preferably from 10 $g/m^2$ to 40 $g/m^2$, more preferably from 10 $g/m^2$ to 30 $g/m^2$, still more preferably from 10 $g/m^2$ to 25 $g/m^2$, particularly preferably from 10 $g/m^2$ to 20 $g/m^2$. In the case where the physical property layer is a non-woven fabric of fiber, when the basis weight of the non-woven fabric in the physical property layer falls within the above-mentioned range, the flexibility becomes more sufficient, a more satisfactory touch feeling can be achieved, shrinkage deformation in a width direction hardly occurs during web handling, cost competitiveness is excellent, printability is satisfactory, the see-through property of printing is satisfactory, pressure-sensitive adhesive application is easy, and the applied pressure-sensitive adhesive hardly exudes to the engaging surface.

When the physical property layer is a non-woven fabric of fiber, the diameter of the fiber is preferably 40 µm or less, more preferably from 1 µm to 40 µm, still more preferably from 1 µm to 30 µm, particularly preferably from 1 µm to 25 µm, most preferably from 1 µm to 20 µm. In the case where the physical property layer is a non-woven fabric of fiber, when the diameter of the fiber falls within the above-mentioned range, the flexibility becomes more sufficient, a more satisfactory touch feeling can be achieved, shrinkage deformation in a width direction hardly occurs during web handling, cost competitiveness is excellent, printability is satisfactory, the see-through property of printing is satisfactory, pressure-sensitive adhesive application is easy, and the applied pressure-sensitive adhesive hardly exudes to the engaging surface. In the case where the physical property layer is a non-woven fabric of fiber, when the diameter of the fiber is larger than 40 µm, there is a fear that shrinkage deformation in a width direction may be liable to occur during web handling, cost competitiveness may be inferior, printability may be poor, pressure-sensitive adhesive application may be difficult, and the applied pressure-sensitive adhesive may have a risk of exuding to the engaging surface.

When the physical property layer is a non-woven fabric of fiber, in the hook-and-loop fastener female member, the density of the non-woven fabric is preferably from 5 kg/m³ to 200 kg/m³, more preferably from 20 kg/m³ to 150 kg/m³, still more preferably from 50 kg/m³ to 150 kg/m³, still more preferably from 50 kg/m³ to 120 kg/m³, particularly preferably from 60 kg/m³ to 120 kg/m³, most preferably from 70 kg/m³ to 120 kg/m³, because the effect of the present invention can be more effectively expressed. The density (kg/m³) of the non-woven fabric in the physical property layer is a value calculated from the basis weight (X g/m²) of the non-woven fabric and the thickness (Y mm) of the non-woven fabric. More specifically, the density (kg/m³) of the non-woven fabric in the physical property layer is calculated as X/Y (kg/m³).

When the physical property layer is a non-woven fabric of fiber, a laminate of different kinds of non-woven fabrics of fiber (e.g., a laminate of spunbonded non-woven fabric/meltblown non-woven fabric/spunbonded non-woven fabric) may be adopted.

When the diameter of the fiber significantly varied in a thickness direction (e.g., SMS or SSMMS), the same number of diameters of the fiber were measured for N=5 or more in each piece of the fiber, and the average value of the measured diameters was defined as the diameter of the fiber. A portion having a locally small thickness due to heat fusion or the like as in spunbond, spunmelt, or the like was not included.

When the physical property layer is a film, its thickness is preferably 60 μm or less, more preferably from 10 μm to 50 μm, still more preferably from 10 μm to 40 μm, particularly preferably from 10 μm to 30 μm, most preferably from 15 μm to 25 μm. In the case where the physical property layer is a film, when its thickness falls within the above-mentioned range, the flexibility becomes more sufficient, a more satisfactory touch feeling can be achieved, shrinkage deformation in a width direction hardly occurs during web handling, cost competitiveness is excellent, the see-through property of printing is satisfactory, and pressure-sensitive adhesive application is easy. In the case where the physical property layer is a film, when its thickness is larger than 60 μm, there is a fear that cost competitiveness may be inferior and the see-through property of printing may degrade.

In the hook-and-loop fastener female member, the total basis weight, which is the sum of the basis weight of the non-woven fabric in the engaging layer and the basis weight of the non-woven fabric in the physical property layer, is preferably 60 g/m² or less, more preferably from 10 g/m² to 57 g/m², still more preferably from 15 g/m² to 53 g/m², particularly preferably from 20 g/m² to 50 g/m², most preferably from 30 g/m² to 47 g/m². In the hook-and-loop fastener female member, when the total basis weight, which is the sum of the basis weight of the non-woven fabric in the engaging layer and the basis weight of the non-woven fabric in the physical property layer, falls within the above-mentioned range, the flexibility becomes more sufficient, a more satisfactory touch feeling can be achieved, and the engaging force with a hook-and-loop fastener male member is more excellent. In addition, in the hook-and-loop fastener female member, when the total basis weight, which is the sum of the basis weight of the non-woven fabric in the engaging layer and the basis weight of the non-woven fabric in the physical property layer, falls within the above-mentioned range, the flexibility becomes more sufficient, a more satisfactory touch feeling can be achieved, shrinkage deformation in a width direction is still less liable to occur during web handling, cost competitiveness is more excellent, printability is more satisfactory, the see-through property of printing is more satisfactory, pressure-sensitive adhesive application is easier, and the applied pressure-sensitive adhesive is still less liable to exude to the engaging surface.

The density of the hook-and-loop fastener female member is preferably 110 kg/m³ or less, more preferably from 5 kg/m³ to 110 kg/m³, still more preferably from 10 kg/m³ to 110 kg/m³, still more preferably from 10 kg/m³ to 80 kg/m³, still more preferably from 10 kg/m³ to 70 kg/m³, particularly preferably from 10 kg/m³ to 60 kg/m³, most preferably from 20 kg/m³ to 50 kg/m³. When the density of the hook-and-loop fastener female member falls within the above-mentioned range, the flexibility becomes more sufficient, a more satisfactory touch feeling can be achieved, and the engaging force with a hook-and-loop fastener male member is more excellent, and hence, in a disposable diaper or the like, the problem of slippage, for example, at the time of wearing or after excretion can be effectively eliminated. When the density of the hook-and-loop fastener female member is more than 110 kg/m³, a state in which the fiber of the non-woven fabric of the hook-and-loop fastener female member is densely packed is established, and hence there is a fear that it may be difficult to insert the engaging portion of a hook-and-loop fastener male member into the hook-and-loop fastener female member and an excellent engaging force cannot be expressed. The density (kg/m³) of the hook-and-loop fastener female member is a value calculated from the basis weight (X g/m²) of the non-woven fabric in the hook-and-loop fastener female member and the thickness (Y mm) of the non-woven fabric in the hook-and-loop fastener female member. More specifically, the density (kg/m³) of the hook-and-loop fastener female member is calculated as X/Y (kg/m³).

In the hook-and-loop fastener female member, it is preferred that the surface of the fiber forming the non-woven fabric included in the engaging layer and the surface of the physical property layer on the engaging layer side contain the same kind of polymer. When the surface of the fiber forming the non-woven fabric included in the engaging layer and the surface of the physical property layer on the engaging layer side contain the same kind of polymer, there can be provided a hook-and-loop fastener female member that has more sufficient flexibility, can achieve a more satisfactory touch feeling, and is more excellent in engaging force with a hook-and-loop fastener male member. In this case, the "surface of the fiber forming the non-woven fabric included in the engaging layer" may be any surface of the fiber, and encompasses, for example, a sheath portion in fiber having a core-sheath structure.

When the surface of the fiber forming the non-woven fabric included in the engaging layer and the surface of the physical property layer on the engaging layer side contain the same kind of polymer, any appropriate polymer may be adopted as the polymer as long as the effect of the present invention is not impaired. Such polymer is preferably polyolefin. When the surface of the fiber forming the non-woven fabric included in the engaging layer and the surface of the physical property layer on the engaging layer side contain the same kind of polyolefin, there can be provided a hook-and-loop fastener female member that has more sufficient flexibility, can achieve a more satisfactory touch feeling, and is more excellent in engaging force with a hook-and-loop fastener male member.

In the hook-and-loop fastener female member, when, for example, a spunbonded non-woven fabric or an air-through non-woven fabric is used as the non-woven fabric of fiber included in the engaging layer, pieces of the fiber forming the non-woven fabric included in the engaging layer can have mutual bonding points. With this, when the hook-and-loop fastener female member has an embossed pattern, not only pieces of the fiber forming the non-woven fabric included in the engaging layer have firm mutual bonding points in the embossed pattern portions (the portions of the plurality of embossments 10 in FIG. 1) as a result of embossing treatment, but also pieces of the fiber forming the non-woven fabric included in the engaging layer have mutual bonding points in the region free of the embossed pattern (the region 20 free of the embossed pattern in FIG. 1). When such structure can be achieved, the hook-and-loop fastener female member has more sufficient flexibility, can achieve a more satisfactory touch feeling, and is more excellent in engaging force with a hook-and-loop fastener male member.

<<3. Application of Layered Article Obtained by Production Method of the Present Invention>>

The layered article obtained by the production method of the present invention can provide a hook-and-loop fastener by being combined with a hook-and-loop fastener male member configured to engage with the layered article. That is, such hook-and-loop fastener includes the layered article obtained by the production method of the present invention and a hook-and-loop fastener male member configured to engage with the layered article. In addition, the layered article obtained by the production method of the present invention can be used for any appropriate article in which the effect of the present invention can be effectively utilized. A typical example of such article is a sanitary article. That is, such sanitary article includes the layered article obtained by the production method of the present invention. Examples of such sanitary article include a diaper (in particular, a disposable diaper), a supporter, and a mask.

EXAMPLES

The present invention is hereinafter specifically described by way of Examples. However, the present invention is by no means limited to these Examples. In Examples and the like, test and evaluation methods are as described below. In addition, "part(s)" means "part(s) by weight" and "%" means "wt o" unless otherwise stated.

<Measurement of Fiber Diameter>

Through the use of a digital microscope "VHX-1000" manufactured by Keyence Corporation, a non-woven fabric surface was photographed at a magnification of 500, and fiber diameters were measured for N=5 or more with the image analysis software of the digital microscope. The average value of the measured fiber diameters was defined as a fiber diameter.

<Number of Holes>

An obtained layered article was cut into a size measuring 30 cm (MD direction) by 20 cm (TD direction), and the number of holes each having a diameter of 300 μm or more present in a fused portion was counted.

<Adhesive Strength>

An obtained layered article was cut into a size measuring 2.5 cm (MD direction) by 10 cm (TD direction), and an adhesive strength between two laminated layers in the TD direction was measured. The measurement was performed by: attaching one side of each of the layers to an upper chuck; attaching the other side thereof to a lower chuck; and pulling the layers at a speed of 300 mm/min (T-type peeling). AG-20 kNG manufactured by Shimadzu Corporation was used as a measuring machine, and a chuck-to-chuck distance was set to 60 mm.

Non-woven fabric breakage: A case in which at the time of each of the measurement and preparation for the measurement, the two layers did not peel from each other, and at least one of the non-woven fabric layers broke was evaluated as "non-woven fabric breakage."

<Production Speed>

In the method of measuring an adhesive strength, the maximum speed of an ultrasonic continuous fusion apparatus needed for obtaining an adhesive strength sufficient to cause the "non-woven fabric breakage" was defined as a production speed.

∘∘: Production speed at which the sufficient adhesive strength is obtained of 100 m/min or more ∘: Production speed at which the sufficient adhesive strength is obtained of 40 m/min or more and less than 100 m/min x: Production speed at which the sufficient adhesive strength is obtained of less than 40 m/min Examples 1 to 7

Raw non-woven fabrics shown in Table 1 were laminated, and were subjected to embossing treatment with an embossed pattern roll at a temperature shown in Table 1 and an ultrasonic continuous fusion apparatus manufactured by Herrmann Ultrasonics (frequency: 20 kHz, pressing force: 900 N) to provide layered articles.

The embossed pattern used was the embossed pattern of an arc shape illustrated in FIG. 2, and the embossment width was 0.8 mm, the maximum value of the distance between two adjacent embossments on a line in the MD direction (maximum embossment-to-embossment distance) was 3.2 mm, and the embossing-fused area ratio was 23%.

The results are shown in Table 1.

Example 8

Layered article production was performed in the same manner as in Example 6 except that in Example 6, the temperature of the embossed pattern roll was set to 70° C., the pressing force was set to 850 N, and the speed was set to 100 m/min.

The results are shown in Table 1.

Examples 9 to 11

Layered article production was performed in the same manner as in Example 8 except that in Example 8, the raw non-woven fabrics were changed as shown in Table 1.

The results are shown in Table 1.

Example 12

Layered article production was performed in the same manner as in Example 6 except that in Example 6, the temperature of the embossed pattern roll was set to 80° C., the pressing force was set to 830 N, and the speed was set to 100 m/min.

The results are shown in Table 1.

Comparative Examples 1 to 3

Raw non-woven fabrics shown in Table 1 were laminated, and were subjected to embossing treatment with an embossed pattern roll at a temperature shown in Table 1 and a rubber roll at room temperature (pressing force: 5,000 N) to provide layered articles.

The embossed pattern used was the embossed pattern of an arc shape illustrated in FIG. 2, and the embossment width was 0.8 mm, the maximum value of the distance between two adjacent embossments on a line in the MD direction (maximum embossment-to-embossment distance) was 3.2 mm, and the embossing-fused area ratio was 23%.

The results are shown in Table 1.

TABLE 1

|  |  | Example 1 | Example 2 | Example 3 | Example 4 | Example 5 | Example 6 | Example 7 |
|---|---|---|---|---|---|---|---|---|
| Engaging layer | Fiber composition | PE/PET | PE/PET | PE/PP | PE/PP | PE/PP | PP | PE/PET |
|  | Fiber diameter [μm] | 31.6 | 31.6 | 18.2 | 20.1 | 20.1 | 21.8 | 31.6 |
|  | Basis weight [g/m²] | 30 | 30 | 22 | 18 | 18 | 18 | 30 |
| Physical property layer | Fiber composition | PE/PP | PE/PP | PE/PP | PE/PP | PE/PP | PP | PE/PP |
|  | Fiber diameter [μm] | 19.8 | 19.8 | 18.2 | 19.8 | 18.2 | 19.6 | 19.8 |
|  | Basis weight [g/m²] | 20 | 15 | 18 | 15 | 20 | 15 | 15 |
| Production method |  | Ultrasonic | Ultrasonic | Ultrasonic | Ultrasonic | Ultrasonic | Ultrasonic | Ultrasonic + heat |
| Temperature of embossed pattern roll |  | 23 | 23 | 23 | 23 | 23 | 23 | 50 |
| Number of holes |  | 0 | 2 | 3 | 3 | 2 | 4 | 0 |
| Adhesive strength [N/25 mm] |  | Non-woven fabric breakage | Non-woven fabric breakage | Non-woven fabric breakage | Non-woven fabric breakage | Non-woven fabric breakage | Non-woven fabric breakage | Non-woven fabric breakage |
| Production speed |  | ○ | ○ | ○ | ○ | ○ | ○ | ○○ |

|  |  | Example 8 | Example 9 | Example 10 | Example 11 | Example 12 | Comparative Example 1 | Comparative Example 2 | Comparative Example 3 |
|---|---|---|---|---|---|---|---|---|---|
| Engaging layer | Fiber composition | PP | PP | PP | PP | PP | PE/PET | PE/PP | PP |
|  | Fiber diameter [μm] | 21.8 | 14.5 | 30.8 | 31.2 | 21.8 | 31.6 | 31.0 | 20.0 |
|  | Basis weight [g/m²] | 18 | 24 | 18 | 24 | 18 | 30 | 30 | 22 |
| Physical property layer | Fiber composition | PP | PP | PP | PP | PP | PE/PP | PE/PP | PP |
|  | Fiber diameter [μm] | 19.6 | 19.6 | 19.6 | 19.6 | 19.6 | 19.8 | 20.2 | 9 |
|  | Basis weight [g/m²] | 15 | 15 | 15 | 15 | 15 | 15 | 20 | 15 |
| Production method |  | Ultrasonic + heat | Ultrasonic + heat | Ultrasonic + heat | Ultrasonic + heat | Ultrasonic + heat | Heat | Heat | Heat |
| Temperature of embossed pattern roll |  | 70 | 70 | 70 | 70 | 80 | 200 | 200 | 200 |
| Number of holes |  | 0 | 0 | 0 | 0 | 0 | 0 | 0 | 0 |
| Adhesive strength [N/25 mm] |  | Non-woven fabric breakage | Non-woven fabric breakage | Non-woven fabric breakage | Non-woven fabric breakage | Non-woven fabric breakage | Non-woven fabric breakage | Non-woven fabric breakage | Non-woven fabric breakage |
| Production speed |  | ○○ | ○○ | ○○ | ○○ | ○○ | x | x | x |

INDUSTRIAL APPLICABILITY

The layered article obtained by the production method of the present invention can be used for any appropriate article in which the effect of the present invention can be effectively utilized. A typical example of such article is a sanitary article. Examples of such sanitary article include a diaper (in particular, a disposable diaper), a supporter, and a mask.

REFERENCE SIGNS LIST

10 embossment
20 region free of embossed pattern
100 fused portion
300 engaging layer
400 physical property layer
500 laminate
1000 horn
2000 rotating anvil

The invention claimed is:

1. A method of producing a layered article, comprising fusing at least part of a single-layer body or a laminate including at least one layer including a non-woven fabric of fiber having a fiber diameter of 100 μm or less through ultrasonic welding,
wherein the ultrasonic welding is performed with a horn and a rotating anvil,
wherein the rotating anvil is heated, and
wherein a pressing force between the horn and the rotating anvil in the ultrasonic welding is from 100 N to 1,500 N.

2. The method of producing a layered article according to claim 1, wherein the method comprises fusing at least part of a laminate including two or three layers each including the non-woven fabric of the fiber having a fiber diameter of 100 μm or less through the ultrasonic welding.

3. The method of producing a layered article according to claim 1, wherein the ultrasonic welding comprises continuous ultrasonic welding.

4. The method of producing a layered article according to claim 1, wherein a temperature of the heating is from 30° C. to 150° C.

5. The method of producing a layered article according to claim 4, wherein the temperature of the heating is from 40° C. to 100° C.

6. The method of producing a layered article according to claim 5, wherein the temperature of the heating is from 60° C. to 80° C.

7. The method of producing a layered article according to claim 1, wherein a fluctuation in temperature of the heating is within ±20° C.

8. The method of producing a layered article according to claim 7, wherein the fluctuation in temperature of the heating is within ±10° C.

9. The method of producing a layered article according to claim 8, wherein the fluctuation in temperature of the heating is within ±5° C.

10. The method of producing a layered article according to claim 1, wherein a surface of the rotating anvil has an embossed pattern.

11. The method of producing a layered article according to claim 10, wherein the embossed pattern comprises a discontinuous embossed pattern.

12. The method of producing a layered article according to claim 1, wherein a ratio of an area of a fused portion obtained by the fusing through the ultrasonic welding to an area of an entire surface of the layered article to be produced is 50% or less.

13. The method of producing a layered article according to claim 12, wherein the ratio of the area of the fused portion is from 1% to 40%.

14. The method of producing a layered article according to claim 13, wherein the ratio of the area of the fused portion is from 10% to 30%.

15. The method of producing a layered article according to claim 1, wherein the fused portion obtained by the fusing includes a fused portion of pieces of the fiber.

16. The method of producing a layered article according to claim 1, wherein a number of holes each having a diameter of 100 μm or more present in the fused portion obtained by the fusing is 10 holes/m$^2$ or less.

17. The method of producing a layered article according to claim 16, wherein the number of holes each having a diameter of 100 82 m or more present in the fused portion is 5 holes/m$^2$ or less.

* * * * *

UNITED STATES PATENT AND TRADEMARK OFFICE
CERTIFICATE OF CORRECTION

PATENT NO. : 10,828,839 B2
APPLICATION NO. : 15/763254
DATED : November 10, 2020
INVENTOR(S) : Shou Uchida et al.

It is certified that error appears in the above-identified patent and that said Letters Patent is hereby corrected as shown below:

In the Claims

At Column 21, Line 27 (Claim 17, Line 3), please change "82 m" to -- µm --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*